United States Patent [19]
Pansard et al.

[11] Patent Number: 5,755,222
[45] Date of Patent: May 26, 1998

[54] FASTENING DEVICE FOR THE MOUTHPIECE OF SCUBA-DIVING APPARATUS

[76] Inventors: Pierre Jean Pansard, 23 BD Dela Gaye, 13009 Marseille; Patrick Rosso, 7 Traverse Bruvet, 13008 Marseille, both of France

[21] Appl. No.: 800,285

[22] Filed: Feb. 12, 1997

[51] Int. Cl.$^6$ ........................ A61F 5/56
[52] U.S. Cl. ............... 128/204.27; 128/207.17; 128/206.29; 128/204.26
[58] Field of Search ............ 128/207.14, 200.29, 128/201.18, 201.19, 201.26, 201.27, 202.15, 204.26, 204.27, 206.29, 207.17, 912, 202.22; 607/37; 604/891.1; 24/271, 70 J, 70 R

[56] References Cited

U.S. PATENT DOCUMENTS

| | | | |
|---|---|---|---|
| 1,847,475 | 3/1932 | Donald | 24/271 |
| 2,018,906 | 10/1935 | Winter | 24/271 |
| 3,132,392 | 5/1964 | Steinberg | 24/70 R |
| 3,207,154 | 9/1965 | Rubilotta et al. | 128/206.29 |
| 4,310,001 | 1/1982 | Comben | 128/202.27 |
| 4,483,337 | 11/1984 | Clair | 128/207.17 |
| 4,516,293 | 5/1985 | Beran | 128/207.17 |
| 4,862,903 | 9/1989 | Campbell | 128/200.2 |
| 5,048,519 | 9/1991 | Kasama et al. | 128/207.14 |
| 5,136,757 | 8/1992 | Labonville | 24/271 |
| 5,485,837 | 1/1996 | Solesbee et al. | 128/207.17 |
| 5,524,616 | 6/1996 | Smith et al. | 128/282.22 |
| 5,548,876 | 8/1996 | Oetiker | 24/271 |
| 5,626,128 | 5/1997 | Bradley et al. | 128/206.29 |

FOREIGN PATENT DOCUMENTS

| 456418 | 6/1913 | France | 24/272 |
|---|---|---|---|

*Primary Examiner*—Aaron J. Lewis
*Assistant Examiner*—V. Srivastava
*Attorney, Agent, or Firm*—Charles E. Temko

[57] ABSTRACT

An improved fastening device for clamping an outlet of a second stage regulator on a scuba-diving apparatus to a mouthpiece to permit rapid manual disengagement without the use of tools. The device includes first and second strap members, each having first ends selectively interconnected by an over center toggle lever, and second ends adjustably interconnected by interconnecting structure held in position by a clamp when the device is under tension, and which permits adjustment in the absence of tension.

3 Claims, 2 Drawing Sheets

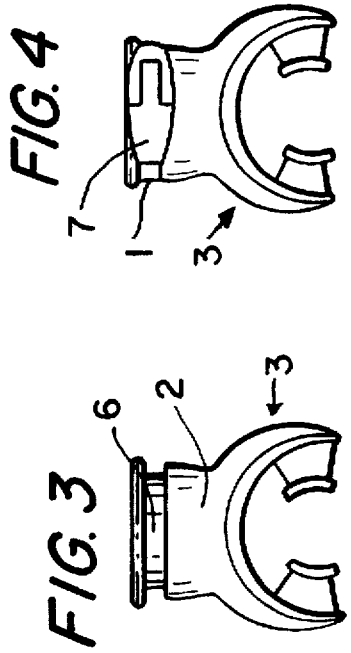
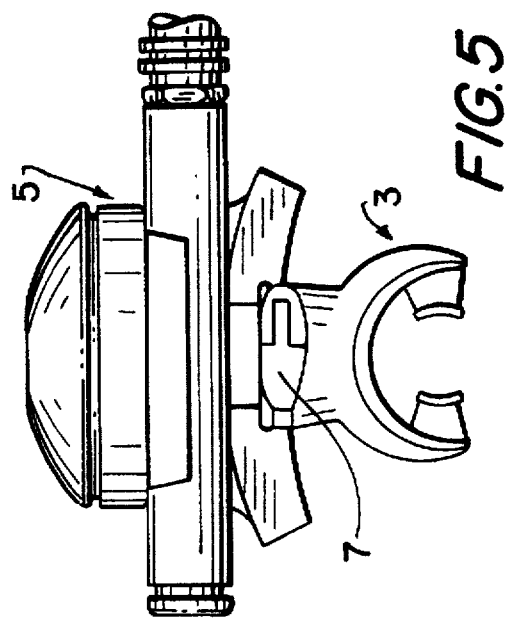
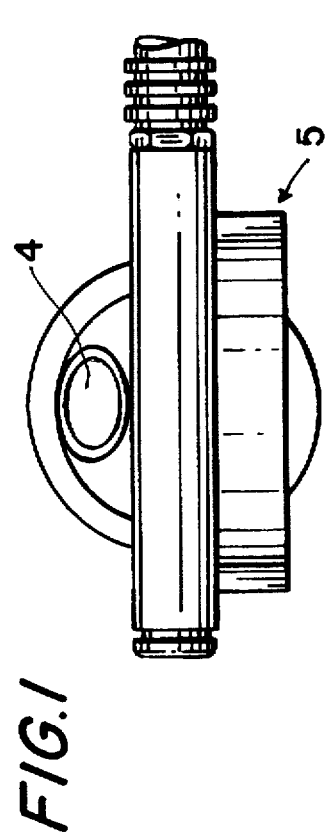
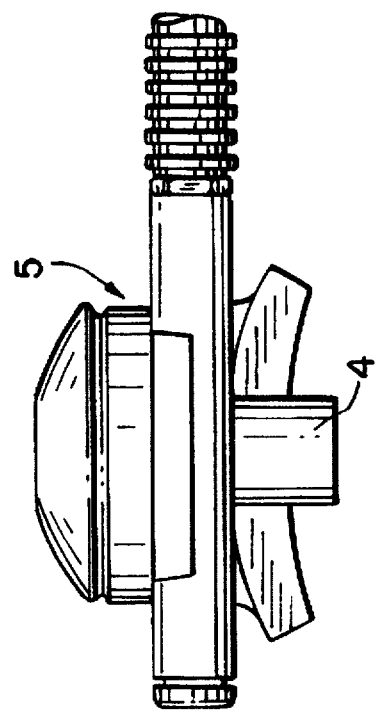

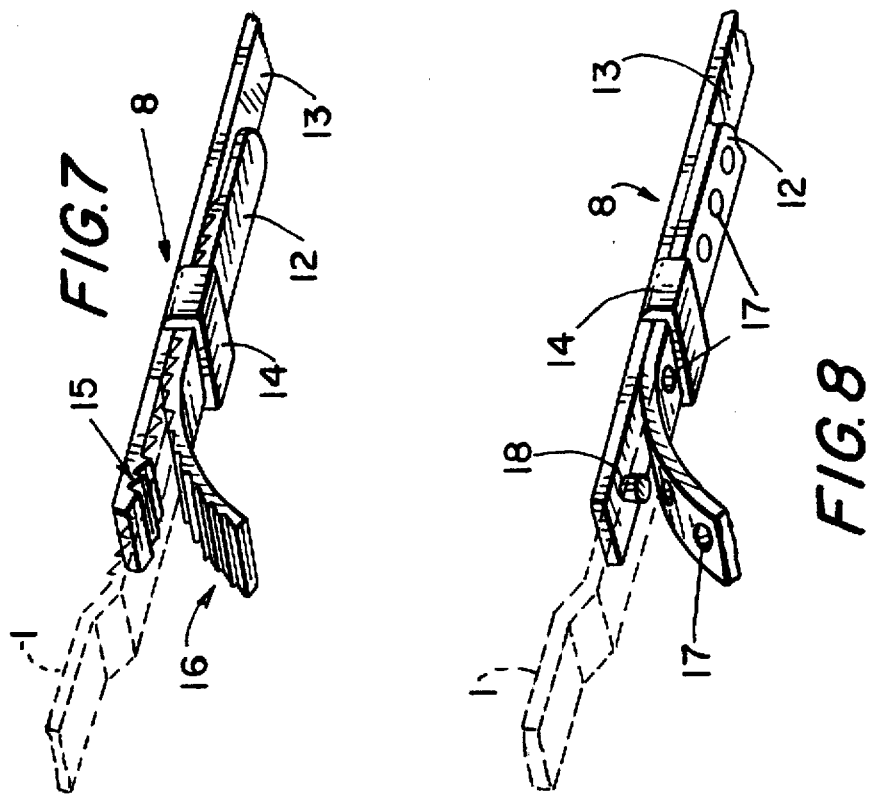
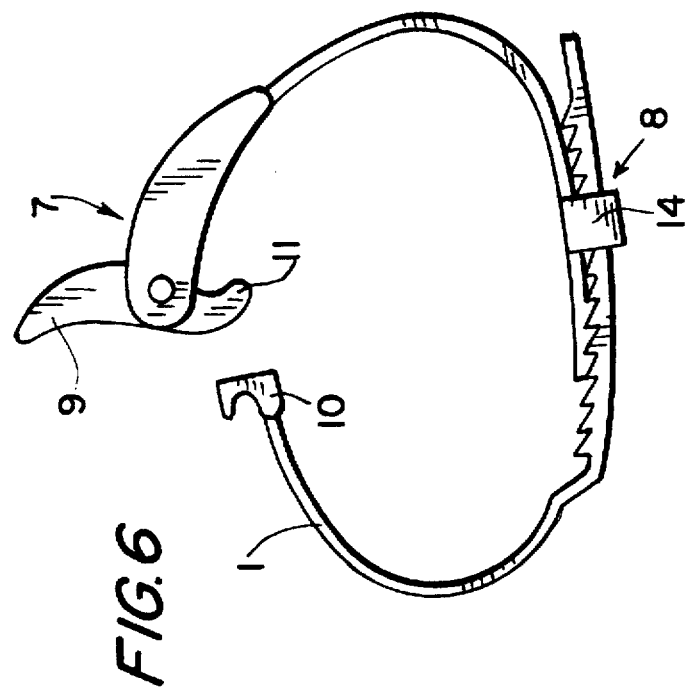

FASTENING DEVICE FOR THE MOUTHPIECE OF SCUBA-DIVING APPARATUS

BACKGROUND OF THE INVENTION

This invention relates generally to the field of elongated fastening devices, and more particularly to such a device for securing a mouthpiece in position on a scuba-diving apparatus.

Because of the relatively high cost of equipment, scuba-diving is broadly practiced within an association, club or school, where the use of the equipment is shared by several persons. The breathing apparatus consists of a tank containing a breathable gas under pressure with a first stage regulator connected by a low pressure hose to a second stage regulator equipped with a mouthpiece allowing the diver to inhale the breathable gas while under water.

Usually, the mouthpiece is not changed after each use. The same mouthpiece is used by several persons resulting in the possibility, if not probability, of a health hazard irrespective of the handling care after each use. Frequently, the apparatus is given to another diver without the mouthpiece being properly disinfected. Such a practice promotes the spread of germs via the mouthpiece.

SUMMARY OF THE INVENTION

Briefly stated, the invention relates to the provision of an improved fastening device which is easily operated without the use of tools which permits each diver to have his own mouthpiece, or be provided with a new mouthpiece to be positioned immediately prior to use, the fastening device being opened and closed about the interconnecting part of the mouthpiece by simple manual manipulation. To this end, the device is comprised of a clamp and a zip-tie, that can be opened and adjusted within seconds on the mouthpiece to fit the second-state regulator.

BRIEF DESCRIPTION OF THE DRAWINGS

In the drawings, to which reference will be made in the specification, similar reference characters have been employed to designate corresponding parts throughout the several views.

FIG. 1 is an elevational view of a second stage regulator in accordance with the prior art.

FIG. 2 is a top plan view of the second stage regulator.

FIG. 3 is a plan view of a known prior art mouthpiece.

FIG. 4 is a similar plan view of the mouthpiece with a fastening device in position.

FIG. 5 is a plan view of the regulator of FIG. 2 in interconnected relation with the mouthpiece and fastening device of FIG. 4.

FIG. 6 is an end elevational view of the embodiment of the invention.

FIG. 7 is a fragmentary view in perspective corresponding to the lower portion of FIG. 6.

FIG. 8 is a fragmentary perspective view showing an alternate form of the invention.

DETAILED DESCRIPTION OF THE DISCLOSED EMBODIMENTS

In accordance with the invention, the fastening device, generally indicated by reference character 1, is adapted to fit the neck 2 of a mouthpiece 3 to secure the same upon a tube 4 comprising part of a second stage regulator 5.

In the prior art, the fastening of the mouthpiece on the second stage regulator is performed at the place of manufacture, although prior art fastening devices can be opened to change the mouthpieces. However, such prior art fastening devices normally require special tools, and as a result, the mouthpieces are usually changed only when damaged.

As is known in the art, the standard mouthpieces 3 are usually injection molded from an elastomeric material to form a groove 6 within which the fastening device is secured. As shown in open condition in FIG. 6 wherein a manually engageable member 9 fills the position of an oppositely disposed extremity 11 which selectively engages a hook 10, following which counter-clockwise movement, as seen in FIG. 6, closes the clamp 7 to the position shown in FIGS. 4 and 5.

Referring to FIG. 7, the zip-tie 15 includes first and second adjustably engageable parts 12 and 13, which are held in engaged condition by a clasp 14. As seen in FIG. 6, interengaging teeth permit the zip-tie to be tightened, but not loosened, under the influence of the clamp 14. This is the case when the device is under tension, and the teeth 15, 16, are thereby maintained by tension exerted on the clamp 14. In the absence of tension in the device, as when the case is in the condition shown in FIG. 6, the member 12 may be flexed to disengage the teeth 15 from the teeth 16, and adjustment can be made to vary the length of the periphery of the device, as is desirable when the device is used on mouthpieces of varying dimensions. Once the clamp 7 has been closed and placed in tension, as when engaging the mouthpiece, this adjustment is no longer possible.

FIG. 8 illustrates an alternate form of the embodiment in which the teeth 15 and 16 of the principal embodiment are replaced by holes 17 and a corresponding projection 18 which are held in engaged condition by the clamp 14 when the device is in tension, and which may be disengaged for adjustment as shown in FIG. 8.

There is thus provided a fastening device, the effective length of which can be varied at will when the device is disengaged from a mouthpiece, but in which adjustment will be maintained once the device is in engaged tensioned condition. Both the clamp 7 and the inter-engaging means 15–18 are capable of manual adjustment without the use any form of tool whatsoever. To accomplish this, the device is formed to include a pair of strap members, each having first and second ends capable of mutual interconnection. At the first ends, an over-center toggle is employed to place the device in tension. At the second ends, a zip-tie provides an adjustable interconnection to vary the effective length of the interconnected strap members, which permits adjustment only when the device is not in tension. Preferably, the device is formed by injection molding from suitable synthetic resinous materials, thus keeping the cost of production at a very reasonable level.

We claim:

1. An improved fastening device (1) for receiving a mouthpiece upon an adjacent second stage regulator or a scuba-diving apparatus, said device being adapted to exert a constrictive force binding said mouthpiece to a correspondingly-shaped outlet on said regulator, said fastening device comprising: a first strap member having first and second ends, said first end forming an engageable hook (10); said second end having a plurality of engageable projections (15) forming part of a zip-tie (8); said second strap member having first and second ends, said first end having an over-center toggle lever (9) pivotally engaged thereon, selectively engageable with said hook (10); said second end of said second strap member having projections (16) selectively engaging said projection (15); and clasp means (14) resiliently clamping said projections (15,16) together when said hook (10) and lever (9) are engaged to place said fastening device (1) under tension upon a mouthpiece, said clasp means (14) allowing disengagement of said projections (15,16) in the absence of tension for purposes of adjustment.

2. A fastening device in accordance with claim 1, in which said projections are in the form of interlocking teeth.

3. A fastening device in accordance with claim 1, in which said interlocking projections 18 engage corresponding holes 17 on said second end of said first strap member.

* * * * *